(12) United States Patent
Chi et al.

(10) Patent No.: US 7,974,905 B1
(45) Date of Patent: Jul. 5, 2011

(54) OUTLIER TRADE DETECTION FOR SECURITIES LENDING TRANSACTIONS

(76) Inventors: Paul Chi, Philadelphia, PA (US); Yuri Brightly, Cambridge, MA (US); Kojo Akabua, Pittsburgh, PA (US)

( * ) Notice: Subject to any disclaimer, the term of this patent is extended or adjusted under 35 U.S.C. 154(b) by 474 days.

(21) Appl. No.: 12/173,401

(22) Filed: Jul. 15, 2008

(51) Int. Cl.
*G06Q 40/00* (2006.01)

(52) U.S. Cl. ............................ 705/36 R; 705/35; 705/37

(58) Field of Classification Search ............... 705/35, 705/36 R, 37
See application file for complete search history.

(56) References Cited

U.S. PATENT DOCUMENTS

| | | | | |
|---|---|---|---|---|
| 2002/0184133 | A1* | 12/2002 | Zangari et al. ............ | 705/36 |
| 2003/0009409 | A1* | 1/2003 | Horner et al. ............ | 705/36 |
| 2005/0228741 | A1* | 10/2005 | Leibowitz ................. | 705/37 |

OTHER PUBLICATIONS

Francis, John W. "Securities Lending: Risk vs. Return", Hoosier Banker; Sep. 1998; 82, 9; Banking Information Source p. 6 (4 pages).*
"Logit Models for Binary Data," printed from http://data.princeton.edu/wws509/notes/c3.pdf, Internet site, accessed on Jul. 15, 2008, 50 pages.

* cited by examiner

*Primary Examiner* — Elda Milef
(74) *Attorney, Agent, or Firm* — K & L Gates LLP

(57) ABSTRACT

Tools are provided for identifying outliers or variations in trade data derived from securities transactions, such as securities lending transactions. Such outliers may provide an indication that a given trade is suspicious or potentially inappropriate from a customer relationship point of view, a regulatory perspective, or a legal standpoint. Trades identified as outliers can be utilized in regression analyses to analyze specific trades, trader-broker relationships, or other trading activity.

19 Claims, 22 Drawing Sheets

| ACCOUNT | CUSIP | BROKER | OPEN DATE | CLOSE DATE | QUANTITY | AMOUNT | REBATE | LOAN # |
|---------|-------|--------|-----------|------------|----------|--------|--------|--------|
| 312069 | 795757103 | 5240 | 12/10/2001 | 12/10/2001 | 4,000 | 80,000.00 | 0.00 | 219017 |
| 312069 | 795757103 | 5240 | 12/10/2001 | 12/20/2001 | 400 | 8,000.00 | 0.00 | 219067 |
| 312221 | 795757103 | 5240 | 12/10/2001 | 12/20/2001 | 100 | 2,000.00 | 0.00 | 219067 |
| 312069 | 795757103 | 32 | 12/11/2001 | 2/8/2002 | 1,000 | 19,000.00 | 0.00 | 219278 |
| 312069 | 795757103 | 5240 | 12/11/2001 | 12/20/2001 | 2,000 | 38,000.00 | 0.00 | 219284 |
| 312069 | 795757103 | 5240 | 12/11/2001 | 12/20/2001 | 1,000 | 19,000.00 | 00.0 | 219407 |
| 364105 | 795757103 | 5240 | 12/11/2001 | 12/20/2001 | 8,400 | 159,600.00 | 0.00 | 219407 |
| 312954 | 795757103 | 5240 | 12/11/2001 | 12/20/2001 | 6,200 | 117,800.00 | 0.00 | 219483 |
| 364105 | 795757103 | 5240 | 12/11/2001 | 12/20/2001 | 5,600 | 106,400.00 | 0.00 | 219483 |
| 364163 | 795757103 | 418 | 12/12/2001 | 12/26/2001 | 400 | 8,000.00 | (23.00) | 219587 |
| 312221 | 795757103 | 5240 | 12/12/2001 | 7/5/2002 | 1,900 | 38,000.00 | 0.00 | 219702 |
| 312302 | 795757103 | 5240 | 12/12/2001 | 5/31/2002 | 10,000 | 200,000.00 | 0.00 | 219702 |
| 312954 | 795757103 | 5240 | 12/12/2001 | 12/20/2001 | 700 | 14,000.00 | 0.00 | 219702 |
| 363426 | 795757103 | 663 | 12/13/2001 | 4/9/2002 | 14,500 | 290,000.00 | 0.00 | 219793 |
| 363426 | 795757103 | 663 | 12/14/2001 | 4/9/2002 | 4,300 | 86,000.00 | 0.00 | 220128 |
| 360151 | 795757103 | 663 | 12/14/2001 | 4/9/2002 | 1,400 | 28,000.00 | 0.00 | 220128 |
| 312302 | 795757103 | 5240 | 12/14/2001 | 12/14/2001 | 1,500 | 30,000.00 | 0.00 | 220234 |
| 312302 | 795757103 | 221 | 12/14/2001 | 3/21/2002 | 1,500 | 30,000.00 | (10.00) | 220263 |
| 312302 | 795757103 | 101 | 12/17/2001 | 4/18/2002 | 1,500 | 30,000.00 | 0.00 | 220349 |
| 312302 | 795757103 | 355 | 12/17/2001 | 3/28/2002 | 1,000 | 20,000.00 | (15.00) | 220360 |
| 312302 | 795757103 | 74 | 12/17/2001 | 3/19/2002 | 2,000 | 40,000.00 | (15.00) | 220370 |
| 312302 | 795757103 | 374 | 12/17/2001 | 1/3/2002 | 2,100 | 42,000.00 | 0.00 | 220381 |
| 312302 | 795757103 | 32 | 12/18/2001 | 2/1/2002 | 3,200 | 60,800.00 | (15.00) | 220621 |
| 312302 | 795757103 | 374 | 12/18/2001 | 5/22/2002 | 17,400 | 330,600.00 | 0.00 | 220658 |
| 363426 | 795757103 | 374 | 12/18/2001 | 4/18/2002 | 2,524 | 47,956.00 | 0.00 | 220658 |
| 360151 | 795757103 | 374 | 12/18/2001 | 1/4/2002 | 76 | 1,444.00 | 0.00 | 220658 |

TABLE 8-LOAN 219793

*FIG. 3A1*

| LOAN | TNAME | CUSIP | BROKER | tbl_FilteredData:OPEN_DAY | | DEMANDSPREAD |
|---|---|---|---|---|---|---|
| 219017 | TRADER A | 795757103 | 5240 | 12/10/2001 | MON | 1.88 |
| 219067 | TRADER A | 795757103 | 5240 | 12/10/2001 | MON | 1.88 |
| 219278 | TRADER A | 795757103 | 32 | 12/11/2001 | TUE | 1.81 |
| 219284 | TRADER A | 795757103 | 5240 | 12/11/2001 | TUE | 1.81 |
| 219407 | TRADER A | 795757103 | 5240 | 12/11/2001 | TUE | 1.81 |
| 219483 | TRADER A | 795757103 | 5240 | 12/11/2001 | TUE | 1.81 |
| 219587 | TRADER D | 795757103 | 418 | 12/12/2001 | WED | 24.81 |
| 219702 | TRADER A | 795757103 | 5240 | 12/12/2001 | WED | 1.81 |
| 219793 | TRADER A | 795757103 | 663 | 12/13/2001 | THU | 1.81 |
| 220128 | TRADER A | 795757103 | 663 | 12/14/2001 | FRI | 1.75 |
| 220234 | TRADER A | 795757103 | 5240 | 12/14/2001 | FRI | 1.75 |
| 220263 | TRADER A | 795757103 | 221 | 12/14/2001 | FRI | 11.75 |
| 220349 | TRADER A | 795757103 | 101 | 12/17/2001 | MON | 1.88 |
| 220360 | TRADER D | 795757103 | 355 | 12/17/2001 | MON | 16.88 |
| 220370 | TRADER A | 795757103 | 74 | 12/17/2001 | MON | 16.88 |
| 220381 | TRADER A | 795757103 | 374 | 12/17/2001 | MON | 1.88 |
| 220621 | TRADER A | 795757103 | 32 | 12/18/2001 | TUE | 16.75 |
| 220658 | TRADER A | 795757103 | 374 | 12/18/2001 | TUE | 1.75 |

COMPARISON BETWEEN THE DETECTION ALGORITHM DATABASE AND ACTUAL TRADING RECORDS

*FIG. 3A2*

| ACCOUNT | CUSIP | BROKER | OPEN DATE | CLOSE DATE | QUANTITY | AMOUNT | REBATE | LOAN # |
|---|---|---|---|---|---|---|---|---|
| 312962 | 57772M107 | 101 | 5/5/2000 | 5/9/2000 | 1,200 | 51,600.00 | 2.00 | 128048 |
| 364171 | 57772M107 | 101 | 5/5/2000 | 5/9/2000 | 900 | 38,700.00 | 2.00 | 128048 |
| 312263 | 57772M107 | 101 | 5/5/2000 | 5/9/2000 | 34,200 | 1,470,600.00 | 2.00 | 128048 |
| 312514 | 57772M107 | 101 | 5/5/2000 | 5/9/2000 | 2,200 | 94,600.00 | 2.00 | 128048 |
| 312514 | 57772M107 | 773 | 5/9/2000 | 5/10/2000 | 7,100 | 305,300.00 | 4.00 | 128341 |
| 312221 | 57772M107 | 773 | 5/9/2000 | 5/10/2000 | 8,300 | 356,900.00 | 4.00 | 128341 |
| 312962 | 57772M107 | 221 | 5/9/2000 | 5/16/2000 | 1,200 | 51,600.00 | 2.00 | 128449 |
| 364171 | 57772M107 | 221 | 5/9/2000 | 5/16/2000 | 900 | 38,700.00 | 2.00 | 128449 |
| 312263 | 57772M107 | 221 | 5/9/2000 | 5/16/2000 | 34,200 | 1,470,600.00 | 2.00 | 128449 |
| 312514 | 57772M107 | 221 | 5/9/2000 | 5/16/2000 | 2,200 | 94,600.00 | 2.00 | 128449 |
| 312221 | 57772M107 | 221 | 5/9/2000 | 5/16/2000 | 48,100 | 2,068,300.00 | 2.00 | 128449 |
| 312069 | 57772M107 | 221 | 5/9/2000 | 5/12/2000 | 41,400 | 1,780,200.00 | 2.00 | 128449 |
| 312221 | 57772M107 | 221 | 5/10/2000 | 5/10/2000 | 8,300 | 356,900.00 | 5.75 | 128636 |
| 312514 | 57772M107 | 221 | 5/10/2000 | 5/10/2000 | 7,100 | 305,300.00 | 5.75 | 128636 |
| 312069 | 57772M107 | 221 | 5/10/2000 | 5/10/2000 | 22,400 | 963,200.00 | 5.75 | 128636 |
| 366872 | 57772M107 | 221 | 5/10/2000 | 11/8/2000 | 13,000 | 559,000.00 | 5.75 | 128636 |
| 181573 | 57772M107 | 221 | 5/10/2000 | 10/19/2000 | 5,100 | 219,300.00 | 5.75 | 128636 |
| 312221 | 57772M107 | 101 | 5/11/2000 | 5/17/2000 | 8,300 | 348,600.00 | 0.50 | 128692 |
| 312514 | 57772M107 | 101 | 5/11/2000 | 5/17/2000 | 7,100 | 298,200.00 | 0.50 | 128692 |
| 312069 | 57772M107 | 101 | 5/11/2000 | 5/17/2000 | 25,900 | 1,087,800.00 | 0.50 | 128692 |
| 312221 | 57772M107 | 101 | 5/15/2000 | 5/17/2000 | 43,700 | 1,879,100.00 | 2.00 | 128908 |
| 312069 | 57772M107 | 101 | 5/15/2000 | 5/17/2000 | 8,600 | 369,800.00 | 2.00 | 128908 |
| 312069 | 57772M107 | 773 | 5/15/2000 | 5/17/2000 | 29,300 | 1,259,900.00 | 2.00 | 129961 |
| 366872 | 57772M107 | 773 | 5/15/2000 | 5/16/2000 | 13,000 | 559,000.00 | 2.00 | 129961 |
| 181573 | 57772M107 | 773 | 5/15/2000 | 5/16/2000 | 35,100 | 1,509,300.00 | 2.00 | 129961 |

TABLE 9-LOAN 128636

*FIG. 3B1*

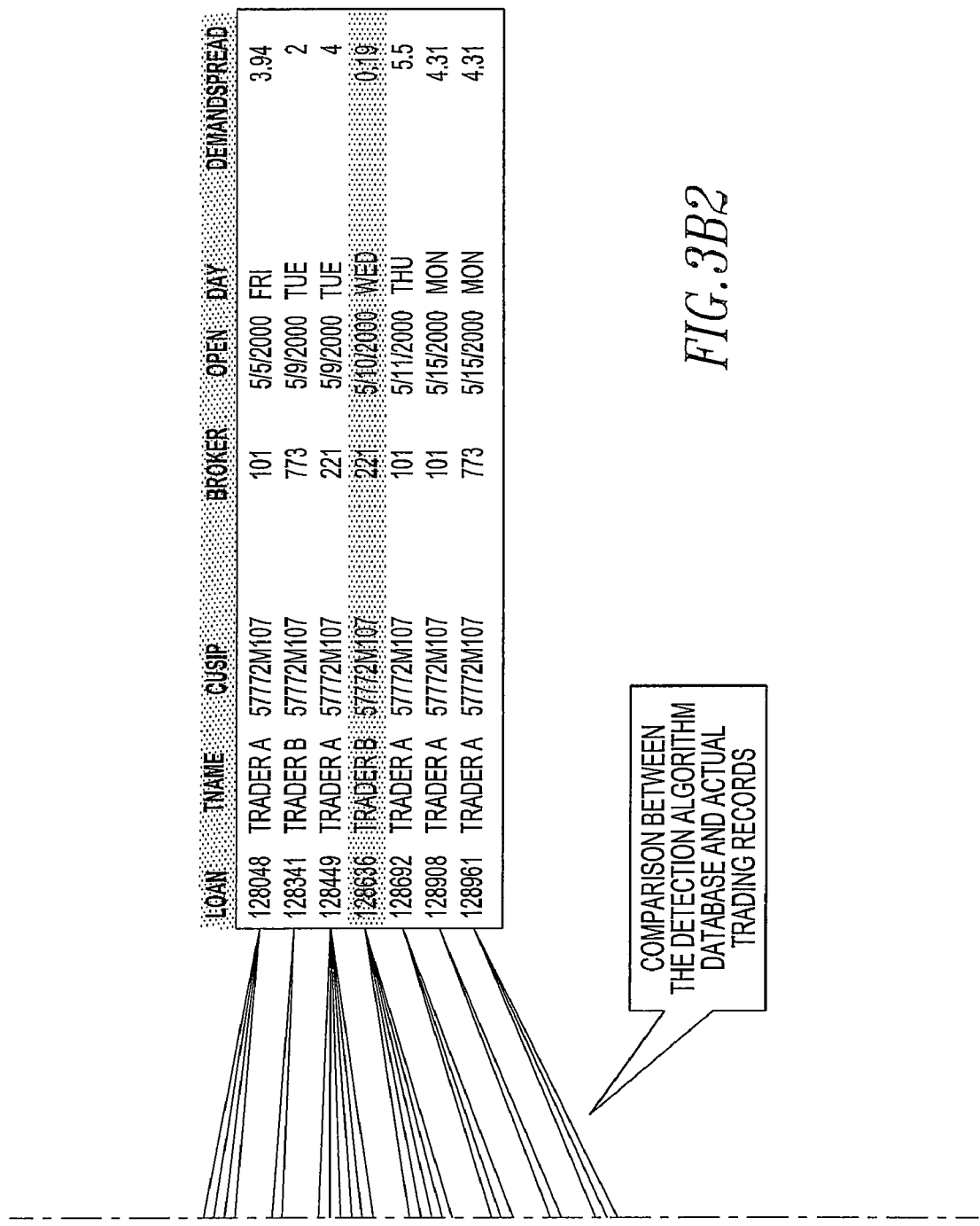
FIG.3B2

| ACCOUNT | CUSIP | BROKER | OPEN DATE | CLOSE DATE | QUANTITY | AMOUNT | REBATE | LOAN # |
|---|---|---|---|---|---|---|---|---|
| 364171 | 25388M100 | 74 | 10/3/2000 | 10/4/2000 | 900 | 36,900.00 | 4.00 | 148770 |
| 327216 | 25388M100 | 74 | 10/3/2000 | 10/4/2000 | 9,100 | 373,100.00 | 4.00 | 148770 |
| 327216 | 25388M100 | 773 | 10/3/2000 | 10/4/2000 | 2,768 | 113,488.00 | 1.00 | 148778 |
| 366733 | 25388M100 | 773 | 10/3/2000 | 10/4/2000 | 900 | 36,900.00 | 1.00 | 148778 |
| 366709 | 25388M100 | 773 | 10/31/2000 | 10/4/2000 | 3,232 | 132,512.00 | 1.00 | 148778 |
| 327216 | 25388M100 | 126 | 10/6/2000 | 10/23/2000 | 22,700 | 930,700.00 | 6.35 | 149465 |
| 364171 | 25388M100 | 126 | 10/6/2000 | 10/6/2000 | 900 | 36,900.00 | 6.35 | 148465 |
| 366733 | 25388M100 | 126 | 10/6/2000 | 10/6/2000 | 900 | 36,900.00 | 6.35 | 149465 |
| 366709 | 25388M100 | 126 | 10/6/2000 | 10/6/2000 | 3,300 | 135,300.00 | 6.35 | 149465 |

TABLE 10-LOAN 149565

FIG.3C1

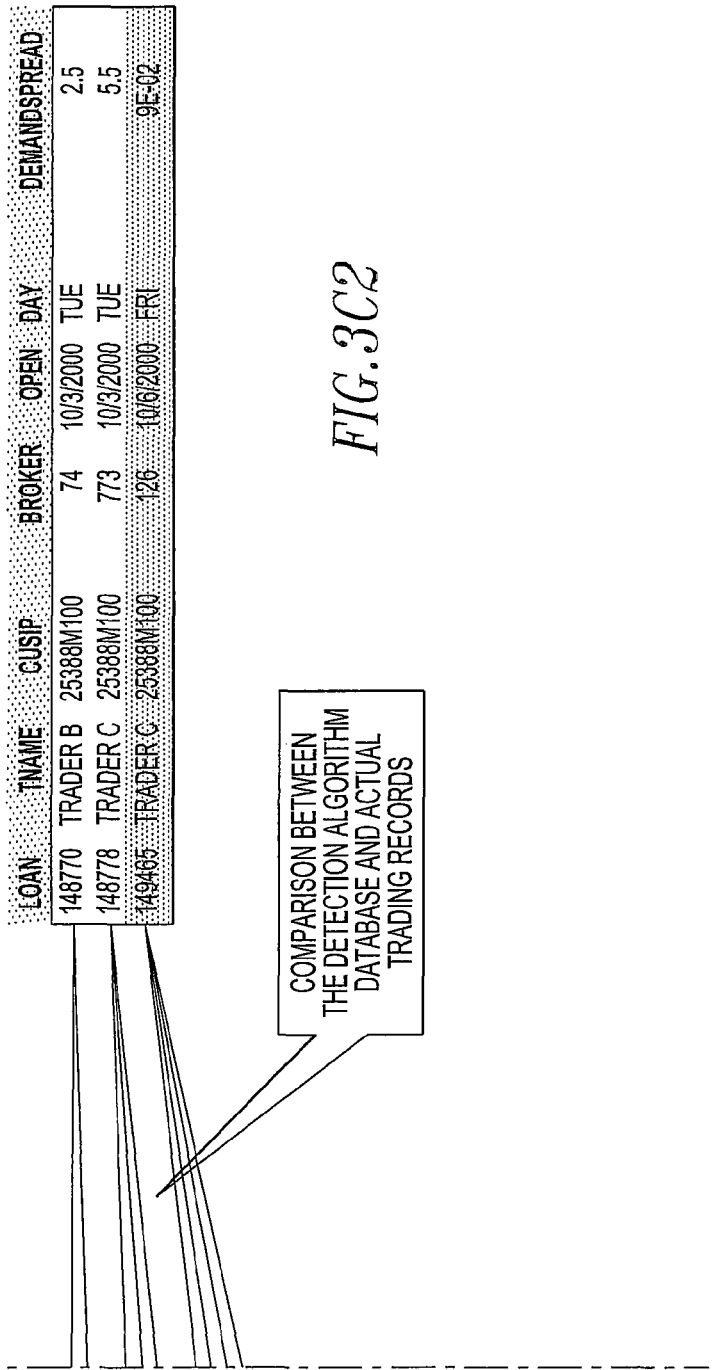
FIG.3C2

| ACCOUNT | CUSIP | BROKER | OPEN DATE | CLOSE DATE | QUANTITY | AMOUNT | REBATE | LOAN # |
|---|---|---|---|---|---|---|---|---|
| 476301 | 594972101 | 456 | 10/31/2000 | 11/1/2000 | 51,300 | 1,231,200.00 | 3.00 | 152985 |
| 366709 | 594972101 | 456 | 10/31/2000 | 11/1/2000 | 20,300 | 487,200.00 | 3.00 | 152985 |
| 114763 | 594972101 | 456 | 11/1/2000 | 11/1/2000 | 30,000 | 750,000.00 | 3.00 | 153038 |
| 114763 | 594972101 | 456 | 11/1/2000 | 11/1/2000 | 58,000 | 1,450,000.00 | 3.00 | 153046 |
| 114763 | 594972101 | 101 | 11/1/2000 | 12/14/2000 | 1,000 | 25,000.00 | 0.00 | 153224 |
| 114763 | 594972101 | 456 | 11/1/2000 | 1/19/2001 | 51,300 | 1,231,200.00 | 3.00 | 153241 |
| 366709 | 594972101 | 456 | 11/1/2000 | 4/4/2002 | 20,300 | 487,200.00 | 3.00 | 153241 |
| 114763 | 594972101 | 5263 | 11/1/2000 | 1/19/2001 | 5,700 | 142,500.000 | 0.00 | 153311 |
| 114763 | 594972101 | 5263 | 11/1/2000 | 11/1/2000 | 100 | 2,500.00 | 0.00 | 153312 |
| 114763 | 594972101 | 5263 | 11/2/2000 | 11/9/2000 | 99 | 2,574.00 | 0.00 | 153458 |
| 366084 | 594972101 | 5263 | 11/2/2000 | 11/9/2000 | 1 | 26.00 | 0.00 | 153458 |

TABLE 11-LOAN 153046

*FIG.3D1*

| LOAN | TNAME | CUSIP | BROKER | OPEN | DAY | DEMANDSPREAD |
|---|---|---|---|---|---|---|
| 153038 | TRADER C | 594972101 | 456 | 11/1/2000 | WED | 3.63 |
| 153046 | TRADER C | 594972101 | 456 | 11/1/2000 | WED | 3.63 |
| 153224 | TRADER A | 594972101 | 101 | 11/1/2000 | WED | 6.63 |
| 153241 | TRADER B | 594972101 | 456 | 11/1/2000 | WED | 3.63 |
| 153311 | TRADER B | 594972101 | 5263 | 11/1/2000 | WED | 6.63 |
| 153312 | TRADER B | 594972101 | 5263 | 11/1/2000 | WED | 6.63 |

COMPARISON BETWEEN THE DETECTION ALGORITHM DATABASE AND ACTUAL TRADING RECORDS

*FIG. 3D2*

| ACCOUNT | CUSIP | BROKER | OPEN DATE | CLOSE DATE | QUANTITY | AMOUNT | REBATE | LOAN # |
|---|---|---|---|---|---|---|---|---|
| 312514 | 57772M107 | 5143 | 1/25/2000 | 1/31/2000 | 5,700 | 233,700.00 | 1.00 | 112363 |
| 312514 | 57772M107 | 418 | 1/26/2000 | 2/4/2000 | 2,400 | 98,400.00 | 1.00 | 112508 |
| 360290 | 57772M107 | 418 | 1/26/2000 | 2/4/2000 | 16,800 | 688,800.00 | 1.00 | 112508 |
| 312263 | 57772M107 | 418 | 1/26/2000 | 2/4/2000 | 16,400 | 672,400.00 | 1.00 | 112508 |
| 312069 | 57772M107 | 418 | 1/26/2000 | 1/27/2000 | 14,400 | 590,400.00 | 1.00 | 112508 |
| 312069 | 57772M107 | 5256 | 1/26/2000 | 2/9/2000 | 46,600 | 1,910,600.00 | 4.00 | 112514 |
| 312221 | 57772M107 | 5256 | 1/26/2000 | 2/9/2000 | 64,100 | 2,628,100.00 | 4.00 | 112514 |
| 360290 | 57772M107 | 5256 | 1/27/2000 | 2/2/2000 | 96,000 | 3,840,000.00 | 4.00 | 112774 |
| 312514 | 57772M107 | 101 | 1/27/2000 | 1/28/2000 | 800 | 32,000.00 | 0.00 | 112951 |
| 312514 | 57772M107 | 221 | 1/27/2000 | 1/31/2000 | 200 | 8,000.00 | 4.00 | 112977 |
| 312263 | 57772M107 | 221 | 1/27/2000 | 1/31/2000 | 3,000 | 120,000.00 | 4.00 | 112977 |
| 312069 | 57772M107 | 221 | 1/27/2000 | 1/31/2000 | 14,400 | 576,000.00 | 4.00 | 112977 |

TABLE 12-LOAN 112977

*FIG. 3E1*

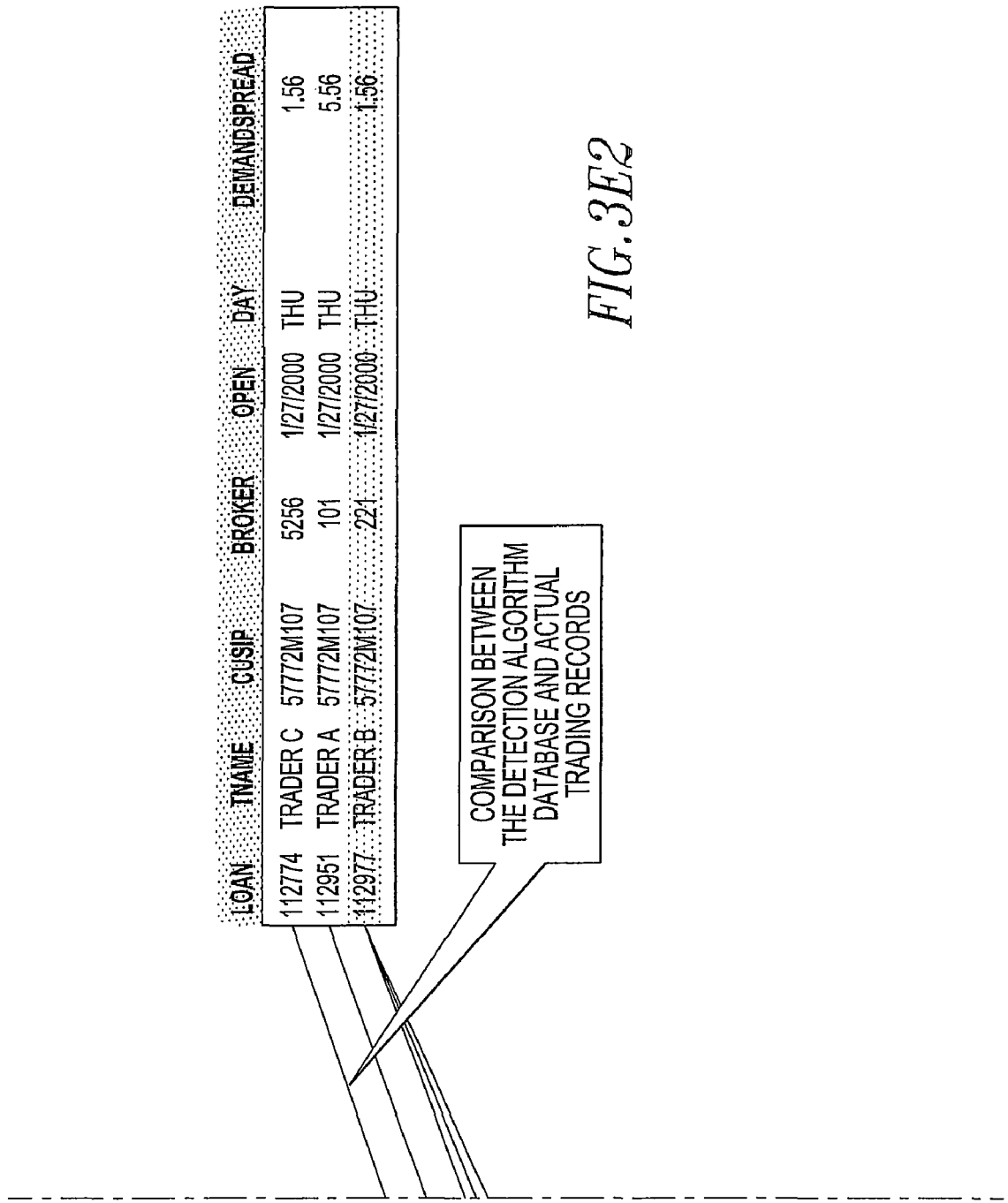
FIG. 3E2

| ACCOUNT | CUSIP | BROKER | OPEN DATE | CLOSE DATE | QUANTITY | AMOUNT | REBATE | LOAN # |
|---|---|---|---|---|---|---|---|---|
| 312899 | 852061506 | 5256 | 2/3/2000 | 2/3/2000 | 1,500 | 171,000.00 | 5.60 | 113394 |
| 369155 | 852061506 | 5256 | 2/3/2000 | 2/8/2000 | 29,761 | 3,392,754.00 | 5.60 | 113394 |
| 364147 | 852061506 | 5256 | 2/3/2000 | 3/15/2000 | 200 | 22,800.00 | 5.60 | 113394 |
| 363264 | 852061506 | 5256 | 2/3/2000 | 3/15/2000 | 48,439 | 5,522,046.00 | 5.60 | 113394 |
| 364066 | 852061506 | 5256 | 2/3/2000 | 3/15/2000 | 1,500 | 171,000.00 | 5.60 | 113394 |
| 312899 | 852061506 | 101 | 2/3/2000 | 2/4/2000 | 1,500 | 171,000.00 | 3.00 | 113404 |
| 363264 | 852061506 | 101 | 2/3/2000 | 2/4/2000 | 10,390 | 1,184,460.00 | 3.00 | 113404 |
| 364066 | 852061506 | 101 | 2/3/2000 | 2/4/2000 | 1,965 | 224,010.00 | 3.00 | 113404 |
| 362739 | 852061506 | 101 | 2/3/2000 | 2/4/2000 | 21,145 | 2,410,530.00 | 3.00 | 113404 |
| 362739 | 852061506 | 355 | 2/3/2000 | 2/4/2000 | 15,000 | 1,710,000.00 | 2.00 | 113423 |
| 362739 | 852061506 | 418 | 2/3/2000 | 2/4/2000 | 10,000 | 1,140,000.00 | 4.75 | 113481 |
| 362739 | 852061506 | 5256 | 2/3/2000 | 2/29/2000 | 10,000 | 1,140,000.00 | 5.55 | 113610 |
| 327020 | 852061506 | 773 | 2/3/2000 | 3/15/2000 | 100 | 11,400.00 | 5.55 | 113654 |
| 327012 | 852061506 | 773 | 2/3/2000 | 4/19/2000 | 100 | 11,400.00 | 5.55 | 113654 |
| 360169 | 852061506 | 773 | 2/3/2000 | 2/16/2000 | 3,400 | 387,600.00 | 5.55 | 113654 |
| 366686 | 852061506 | 773 | 2/3/2000 | 2/16/2000 | 6,100 | 695,400.00 | 5.55 | 113654 |
| 360143 | 852061506 | 773 | 2/3/2000 | 4/19/2000 | 7,400 | 843,600.00 | 5.55 | 113654 |
| 363264 | 852061506 | 773 | 2/3/2000 | 4/19/2000 | 16,600 | 1,892,400.00 | 5.55 | 113654 |
| 366660 | 852061506 | 773 | 2/3/2000 | 4/19/2000 | 4,000 | 456,000.00 | 5.55 | 113654 |
| 327038 | 852061506 | 126 | 2/3/2000 | 2/4/2000 | 87,229 | 9,944,106.00 | 5.55 | 113662 |
| 366686 | 852061506 | 126 | 2/3/2000 | 2/4/2000 | 571 | 65,094.00 | 5.55 | 113662 |
| 360185 | 852061506 | 126 | 2/3/2000 | 2/4/2000 | 36,000 | 4,104,000.00 | 5.55 | 113662 |
| 360185 | 852061506 | 126 | 2/3/2000 | 3/16/2000 | 4,000 | 456,000.00 | 5.55 | 113664 |
| 364066 | 852061506 | 126 | 2/3/2000 | 3/16/2000 | 36,000 | 4,104,000.00 | 5.55 | 113664 |
| 364066 | 852061506 | 126 | 2/3/2000 | 2/7/2000 | 10,000 | 1,140,000.00 | 5.55 | 113665 |
| 363264 | 852061506 | 126 | 2/3/2000 | 3/1/2000 | 50,000 | 5,700,000.00 | 5.78 | 113691 |

TABLE 13-LOAN 113665

*FIG. 3F1*

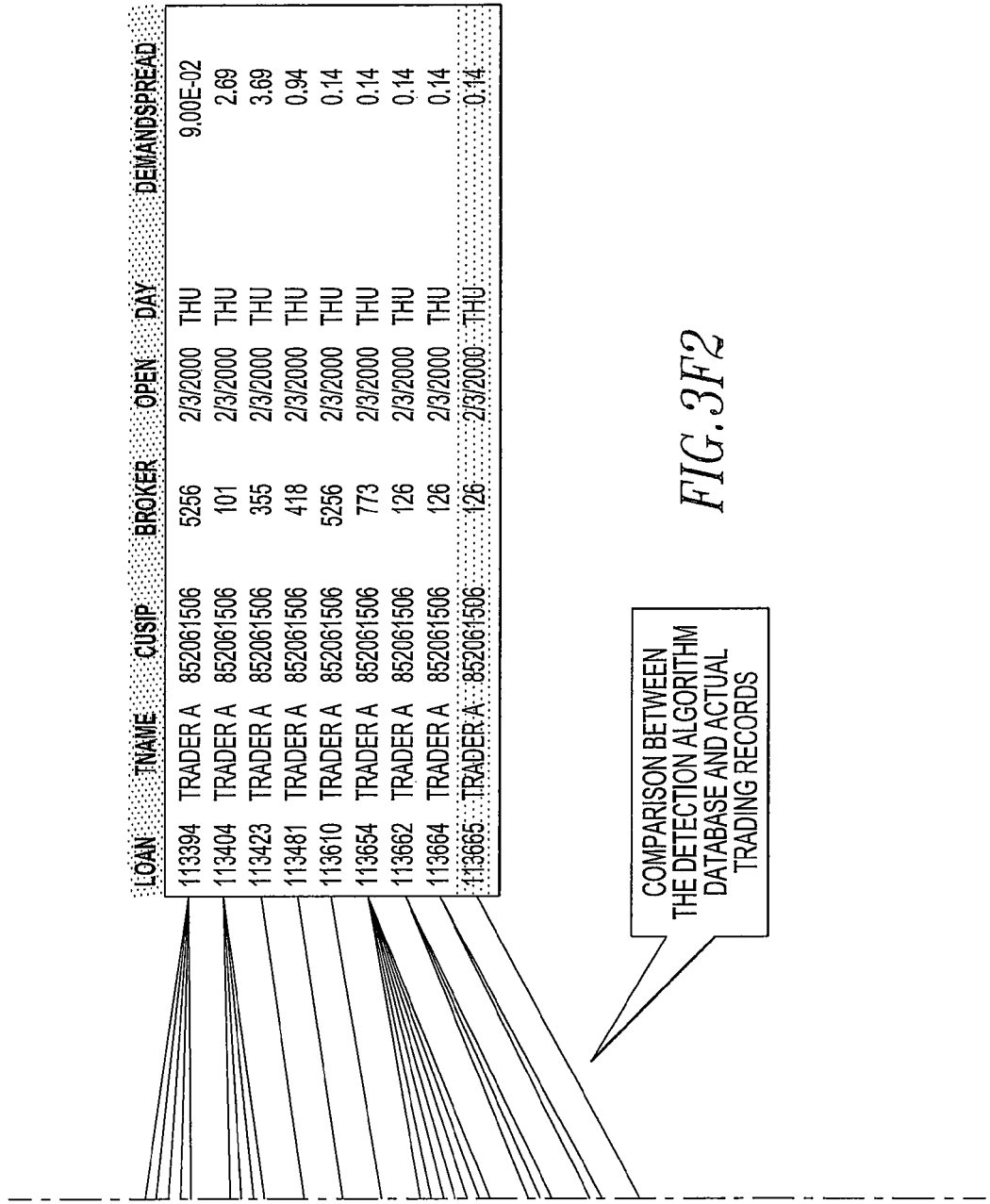
FIG. 3F2

| LOAN | TNAME | CUSIP | BROKER | OPEN | DAY | DEMANDSPREAD |
|---|---|---|---|---|---|---|
| 153038 | TRADER C | 594972101 | 456 | 11/1/2000 | WED | 3.63 |
| 153046 | TRADER C | 594972101 | 456 | 11/1/2000 | WED | 3.63 |
| 153224 | TRADER A | 594972101 | 101 | 11/1/2000 | WED | 6.63 |
| 153241 | TRADER B | 594972101 | 456 | 11/1/2000 | WED | 3.63 |
| 153311 | TRADER B | 594972101 | 5263 | 11/1/2000 | WED | 6.63 |
| 153312 | TRADER B | 594972101 | 5263 | 11/1/2000 | WED | 6.63 |

TABLE 4-LOAN 153046-METHOD 0

[Callout on row 153046]: COMPARED TO ANOTHER INTRA DAY DATA POINT, 6.63, THE INVESTIGATED SPREAD, 3.63 WAS LOWER BY MORE THAN 200 BASE POINTS, THUS IDENTIFIED AS AN OUTLIER UNDER METHOD 0.

FIG. 6A

| LOAN | TNAME | CUSIP | BROKER | OPEN | DAY | DEMANDSPREAD |
|---|---|---|---|---|---|---|
| 112774 | TRADER C | 57772M107 | 5256 | 1/27/2000 | THU | 1.56 |
| 112951 | TRADER A | 57772M107 | 101 | 1/27/2000 | THU | 5.56 |
| 112977 | TRADER B | 57772M107 | 221 | 1/27/2000 | THU | 1.56 |

TABLE 5-LOAN 112977-METHOD 0

[Callout on row 112977]: COMPARED TO ANOTHER INTRA DAY DATA POINT, 5.56, THE INVESTIGATED SPREAD, 1.56 WAS LOWER BY MORE THAN 200 BASE POINTS, THUS IDENTIFIED AS AN OUTLIER UNDER METHOD 0.

FIG. 6B

| LOAN | TNAME | CUSIP | BROKER | tbl_FilteredData.OPEN | DAY | DEMANDSPREAD |
|---|---|---|---|---|---|---|
| 219017 | TRADER A | 795757103 | 5240 | 12/10/2001 | MON | 1.88 |
| 219067 | TRADER A | 795757103 | 5240 | 12/10/2001 | MON | 1.88 |
| 219278 | TRADER A | 795757103 | 32 | 12/11/2001 | TUE | 1.81 |
| 219284 | TRADER A | 795757103 | 5240 | 12/11/2001 | TUE | 1.81 |
| 219407 | TRADER A | 795757103 | 5240 | 12/11/2001 | TUE | 1.81 |
| 219483 | TRADER A | 795757103 | 5240 | 12/11/2001 | TUE | 1.81 |
| 219587 | TRADER D | 795757103 | 418 | 12/12/2001 | WED | 24.81 |
| 219702 | TRADER A | 795757103 | 5240 | 12/12/2001 | WED | 1.81 |
| 219793 | TRADER A | 795757103 | 663 | 12/13/2001 | THU | 1.81 |
| 220128 | TRADER A | 795757103 | 663 | 12/14/2001 | FRI | 1.75 |
| 220234 | TRADER A | 795757103 | 5240 | 12/14/2001 | FRI | 1.75 |
| 220263 | TRADER A | 795757103 | 221 | 12/14/2001 | FRI | 11.75 |
| 220349 | TRADER A | 795757103 | 101 | 12/17/2001 | MON | 1.88 |
| 220360 | TRADER D | 795757103 | 355 | 12/17/2001 | MON | 16.88 |
| 220370 | TRADER A | 795757103 | 74 | 12/17/2001 | MON | 16.88 |
| 220381 | TRADER A | 795757103 | 374 | 12/17/2001 | MON | 1.88 |
| 220621 | TRADER A | 795757103 | 32 | 12/18/2001 | TUE | 16.75 |
| 220658 | TRADER A | 795757103 | 374 | 12/18/2001 | TUE | 1.75 |

TABLE 2-LOAN 219793-METHOD 1

THREE-DAY AVERAGE PRIOR TO THE EXAMINED DAY: 5.67

THREE-DAY AVERAGE PAST THE EXAMINED DAY: 7.90

THE AVERAGE OF TWO DATA POINTS, 6.7856 AS A PREDICTED RATE AGAINST THE INVESTIGATED RATE, 1.81, WHICH WAS THUS IDENTIFIED AS AN OUTLIER BECAUSE THE DIFFERENCE BETWEEN 1.81 AND 6.7856 WAS BEYOND THE THRESHOLD, 200 BASE POINTS UNDER METHOD 1.

*FIG. 7A*

| LOAN | TNAME | CUSIP | BROKER | OPEN | DAY | | DEMANDSPREAD |
|---|---|---|---|---|---|---|---|
| 128048 | TRADER A | 57772M107 | 101 | | 5/5/2000 | FRI | 3.94 |
| 128341 | TRADER B | 57772M107 | 773 | | 5/9/2000 | TUE | 2 |
| 128449 | TRADER A | 57772M107 | 221 | | 5/9/2000 | TUE | 4 |
| 128636 | TRADER B | 57772M107 | 221 | | 5/10/2000 | WED | 0.19 |
| 128692 | TRADER A | 57772M107 | 101 | | 5/11/2000 | THU | 5.5 |
| 128908 | TRADER A | 57772M107 | 101 | | 5/15/2000 | MON | 4.31 |
| 128961 | TRADER A | 57772M107 | 773 | | 5/15/2000 | MON | 4.31 |
| 129156 | TRADER A | 57772M107 | 101 | | 5/17/2000 | WED | 5.94 |
| 129217 | TRADER C | 57772M107 | 352 | | 5/17/2000 | WED | 4.44 |
| 130109 | TRADER B | 57772M107 | 101 | | 5/24/2000 | WED | 3.44 |
| 130135 | TRADER A | 57772M107 | 773 | | 5/24/2000 | WED | 4.44 |
| 130657 | TRADER C | 57772M107 | 5143 | | 5/30/2000 | TUE | 1.13 |
| 130788 | TRADER C | 57772M107 | 126 | | 5/31/2000 | WED | 1.31 |

TABLE 3-LOAN 128638-METHOD 1

THREE-DAY AVERAGE PRIOR TO THE EXAMINED DAY: 3.47

THREE-DAY AVERAGE PAST THE EXAMINED DAY: 4.91

THE AVERAGE OF TWO DATA POINTS, 4.1875 AS A PREDICTED RATE AGAINST THE INVESTIGATED RATE, 0.19, WHICH WAS THUS IDENTIFIED AS AN OUTLIER BECAUSE THE DIFFERENCE BETWEEN 0.19 AND 4.1875 WAS BEYOND THE THRESHOLD, 200 BASE POINTS UNDER METHOD 1.

*FIG. 7B*

| LOAN | TNAME | CUSIP | BROKER | OPEN | DAY | DEMANDSPREAD |
|---|---|---|---|---|---|---|
| 113394 | TRADER A | 852061508 | 5256 | | 2/3/2000 THU | 9.00E-02 |
| 113404 | TRADER A | 852061508 | 101 | | 2/3/2000 THU | 2.69 |
| 113423 | TRADER A | 852061508 | 355 | | 2/3/2000 THU | 3.69 |
| 113481 | TRADER A | 852061508 | 418 | | 2/3/2000 THU | 0.94 |
| 113610 | TRADER A | 852061508 | 5256 | | 2/3/2000 THU | 0.14 |
| 113654 | TRADER A | 852061508 | 773 | | 2/3/2000 THU | 0.14 |
| 113662 | TRADER A | 852061508 | 126 | | 2/3/2000 THU | 0.14 |
| 113664 | TRADER A | 852061508 | 126 | | 2/3/2000 THU | 0.14 |
| 113665 | TRADER A | 852061508 | 126 | | 2/3/2000 THU | 0.14 |

TABLE 6-LOAN 113665-CONSOLIDATED METHOD

COMPARED TO ANOTHER INTRA DAY DATA POINT, 3.69, THE INVESTIGATED SPREAD, 0.14 WAS LOWER BY MORE THAN 200 BASE POINTS, THUS IDENTIFIED AS AN OUTLIER UNDER METHOD 0.

*FIG. 9A*

| LOAN | TNAME | CUSIP | BROKER | OPEN | DAY | | DEMANDSPREAD |
|---|---|---|---|---|---|---|---|
| 148770 | TRADER B | 25388M100 | 74 | | 10/3/2000 | TUE | 2.5 |
| 148778 | TRADER C | 25388M100 | 773 | | 10/3/2000 | TUE | 5.5 |
| 149465 | TRADER C | 25388M100 | 126 | | 10/6/2000 | FRI | 9E-02 |
| 150230 | TRADER C | 25388M100 | 773 | | 10/13/2000 | FRI | 2.44 |
| 151105 | TRADER C | 25388M100 | 5256 | | 10/19/2000 | THU | 2.5 |
| 151988 | TRADER C | 25388M100 | 126 | | 10/25/2000 | WED | 0.15 |
| 152530 | TRADER C | 25388M100 | 773 | | 10/30/2000 | MON | 0.23 |

TABLE 7-LOAN 149465-CONSOLIDATED METHOD

THREE-DAY AVERAGE PRIOR TO THE EXAMINED DAY: 4

SINCE ONLY LEFT TAIL DATA POINT AVAILABLE, THIS DATA POINT ONLY, 4 AS A PREDICTED RATE AGAINST THE INVESTIGATED RATE, 0.00, WHICH WAS THUS IDENTIFIED AS AN OUTLIER BECAUSE THE DIFFERENCE BETWEEN 0.09 AND 4 WAS BEYOND THE THRESHOLD, 200 BASE POINTS UNDER METHOD I.

SAME CUSIP NOT TRADED DURING THREE DAYS PAST THE EXAMINED DAY

OUTLIER TRADE DETECTION FOR SECURITIES LENDING TRANSACTIONS

FIELD OF THE INVENTION

The invention generally relates to systems, processes, tools, techniques and strategies for analyzing financial transactions. In various embodiments, the invention more particularly relates to processing and analyzing data derived from securities transactions, such as securities lending transactions.

BACKGROUND

The ability for investors and other entities to lend and borrow securities and engage in other types of securities transactions is an important component of a modern global economy.

Unlike sales of many other types of securities, there is no established market or exchange for securities lending transactions. Even when available, market clearing information on the value of a given borrowed security is often incomplete and outdated. As a result, there is no effective benchmark against which individual lending transactions can be compared to ensure that lenders and/or borrowers are achieving optimal value. Moreover, the unavailability and transient nature of securities trading data can be further compounded by the lack of proper analysis tools necessary to process and analyze the data.

In association with lending securities, it is useful to identify preferential arrangements which may consciously or unconsciously exist between certain traders and certain brokers and which might negatively impact optimum pricing levels. Inefficient manual reviews of trades made during a given day, week or other time period are often employed in an attempt to analyze trading activity, to identify anomalous trades and to evaluate the performance of individual traders. However, such manual reviews of trading data are often inadequate to detect potentially inappropriate trader-broker relationships.

In view of these issues, enhanced systems, processes, tools, techniques and strategies are needed for analyzing security trades, including trade data which arise from securities lending transactions.

BRIEF DESCRIPTION OF THE FIGURES

The utility of the embodiments of the invention will be readily appreciated and understood from consideration of the following description of the embodiments of the invention when viewed in connection with the accompanying drawings, wherein:

FIGS. 3A1 through 3F2 include tabulations of examples of raw trade data in comparison to data stored in a trade data processing system configured in accordance with embodiments of the invention;

FIGS. 6A and 6B include examples of data processed under a first trade detection methodology executed in accordance with embodiments of the invention;

FIGS. 7A and 7B include examples of data processed under a second trade detection methodology executed in accordance with embodiments of the invention;

DESCRIPTION

Figure 1:
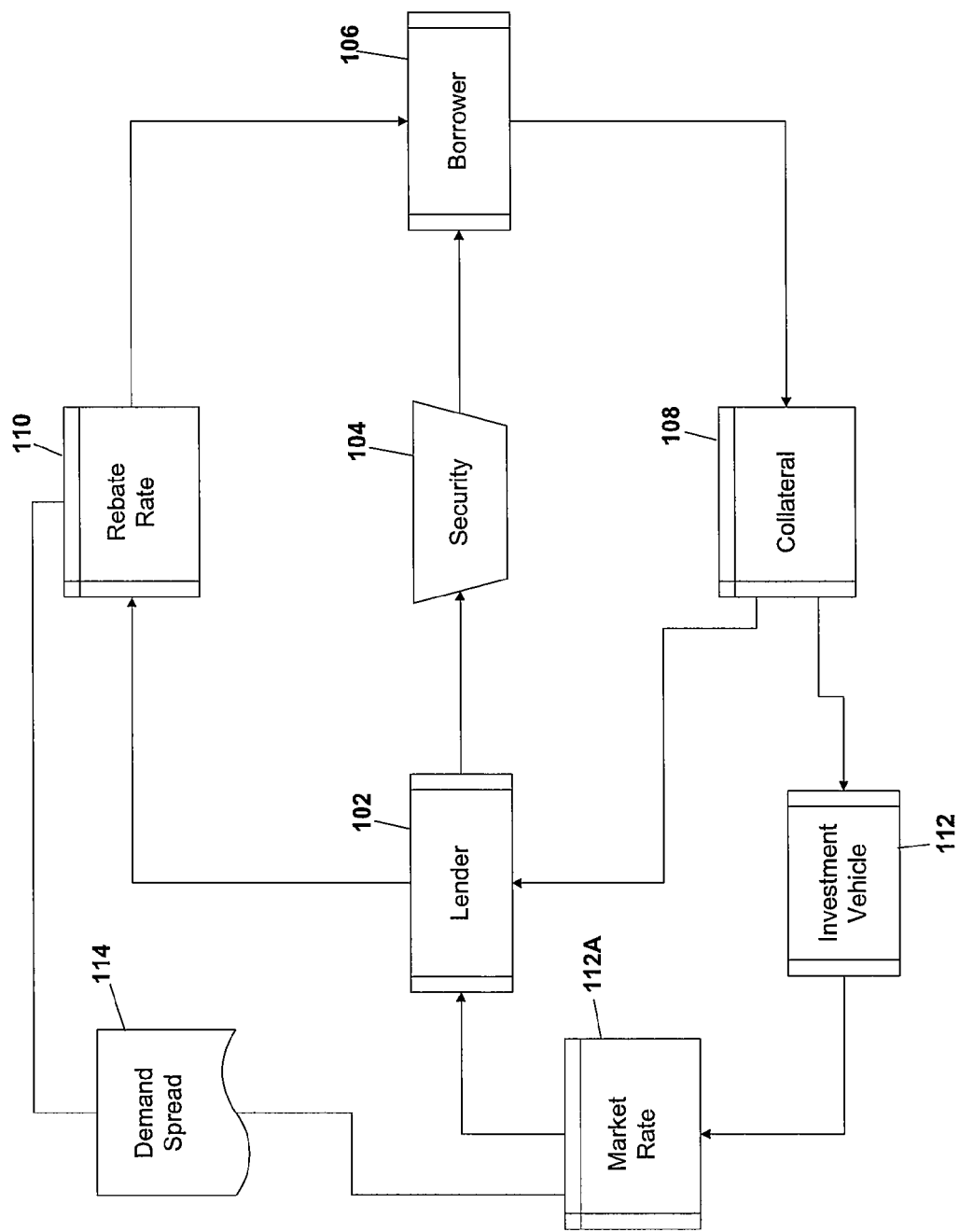
FIGS. 1 and 2 schematically illustrate arrangements under which trading activity can be performed for securities lending transactions.

Embodiments of the invention provide enhanced processes, methods, tools, strategies, techniques for more effectively and efficiently managing, processing and analyzing trade data. In general, such trade data may be derived from a variety of transactions involving brokers and traders, for example. Also, the trade data may be derived more specifically from brokers and traders involved in different securities lending transactions. While many of the examples described herein are in the context of securities lending transactions, it can be appreciated that various embodiments of the invention are equally applicable to other financial transactions that generate trade data. For example, the detection methodologies described herein can be employed in any type of trading environment in which multiple traders and multiple counterparties are involved in securities trading transactions.

Embodiments of the invention include identifying outliers or variations in data patterns arising from trade data. As applied herein in the context of trade data, an "outlier" may be defined as a data point outside of one or more predetermined variation threshold ranges or spreads of trade values (e.g., a range of +/−100 basis points (100 bps), a range of +/−200 basis points (200 bps), etc.). An "outlier" may provide an indication that a given outlier trade is at least suspicious or potentially inappropriate from a customer relationship perspective, a regulatory point of view, and/or a legal standpoint. An outlier can be defined as a transaction between a trader and a broker whose value, as measured by the demand spread (intrinsic value), is outside a derived "norm" with upper and lower bounds. The lower and upper bounds can be selected to allow for discretionary trading practices. Trades that fall outside of the bounds can be identified as outliers in the data set and then utilized as dependent variables in subsequent logistic regressions or other regression analyses.

After performing various optional cleansing or data preparation steps, the trade data may be processed through multiple trade detection methodologies. The trade detection methodologies can serve as data filters which apply different algorithms to detect outlier trading activity. Once an outlier trade data set is identified, the outlier data set can then be processed through one or more different types of statistical regressions. The output of the statistical regression processing may include, for example, a list of traders or given trader-broker relationships ranked by probability that the trade or relationship will generate an outlier trade. Such analyses can be useful for identifying patterns of trading with specific borrowers or for specific traders working for a lender, for example. Embodiments of the invention can thus be used as tool to promote compliance with applicable regulations or laws governing securities related transactions. Embodiments of the invention can also be used to process relatively large volumes of trade data to identify and prioritize specific issues in the trade data that need to be addressed. The invention provides an alternative to performing cumbersome manual reviews of numerous permutations of trader combinations and prices of transactions in an often fruitless attempt to identify trends or patterns in the trade data.

FIG. 1 schematically illustrates an example of an arrangement for performing securities transactions between lenders and borrowers. In a typical securities lending transaction, a lender 102 transfers ownership of a security 104 to a borrower 106. In return, the borrower 106 provides the lender 102 with collateral 108 and a promise to return the security 104. The collateral 108 is often cash, but can take other forms, such as an irrevocable letter of credit, or equivalent securities, for example. The value of the collateral 108 is typically greater than the value of the borrowed security 104 by a predetermined amount (e.g., 2% for domestic securities, 5% for overseas securities). In addition to providing the security 104, the lender 102 may also agree to pay the borrower 106 a rebate rate 110 equal to a predetermined percentage of the value of the collateral 108. The amount of the rebate rate 110 can be determined based on the value of the borrowed security 104, which is affected by factors such as the relative availability of the security 104 to be borrowed, for example, or other market conditions.

The lender 102 may retain the collateral 108 in an investment fund or other investment vehicle 112 paying a market rate 112A, for example, which may pay a return equal or close to the federal funds rate. Under this arrangement, it can be seen that the lender 102 may receive collateral 108 that is greater than the value of the loaned security 104; earn a return on the collateral 108 equivalent to the market rate 112A (e.g., the federal funds rate); and pay a rebate rate 110 to the borrower 106. Accordingly, the value of the transaction to the lender 102 may be equal to the difference between the rebate rate 110 and the market 112A, which may be considered a demand spread 114 for the transaction involving the security 104.

Figure 2:
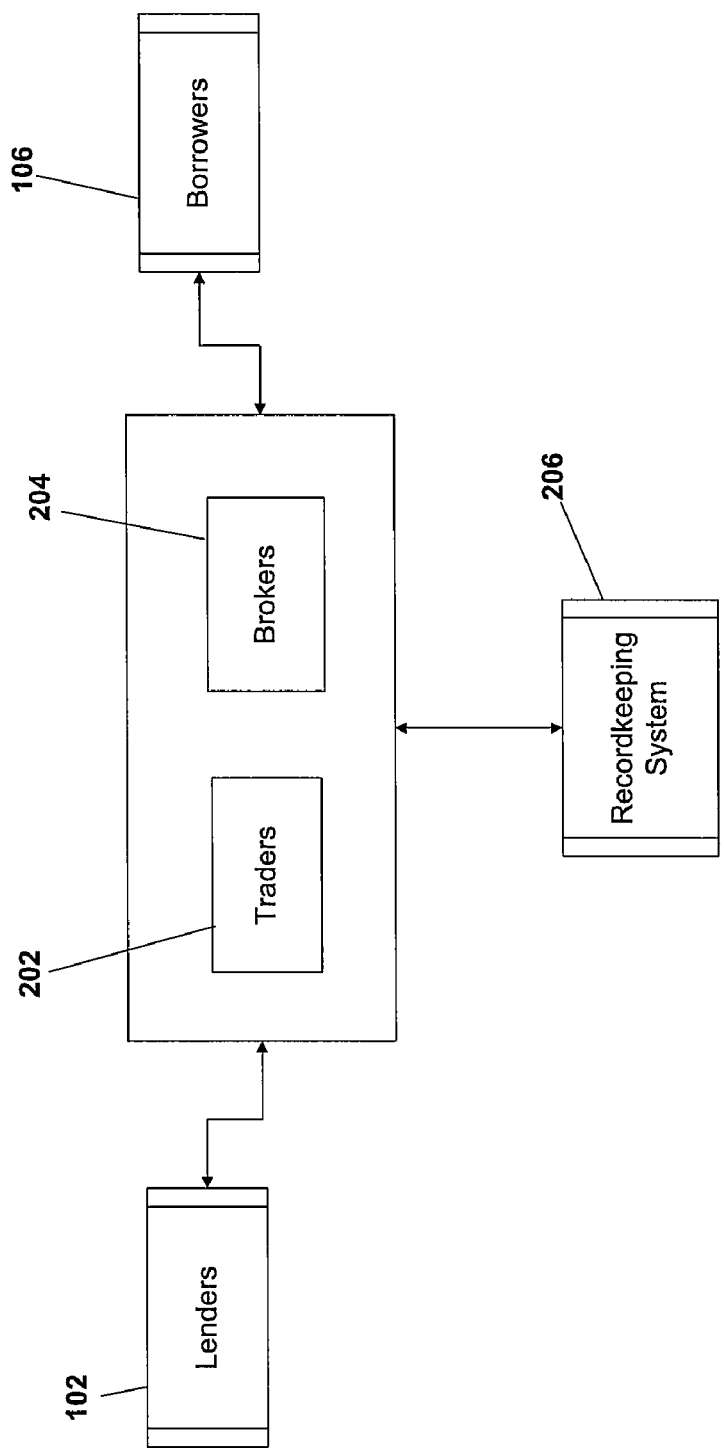

As shown in FIG. 2, one or more traders 202 and/or brokers 204 may facilitate securities-related transactions between the lenders 102 and the borrowers 106. Records of security transactions or trades executed between the lenders 102 and the borrowers 106 may be stored in a recordkeeping system 206 that reflects the trade data associated with different security transactions. Examples of trade data that may be stored and retained in the recordkeeping system 206 are shown in the tables of FIGS. 3A1-3F2.

Figure 4:
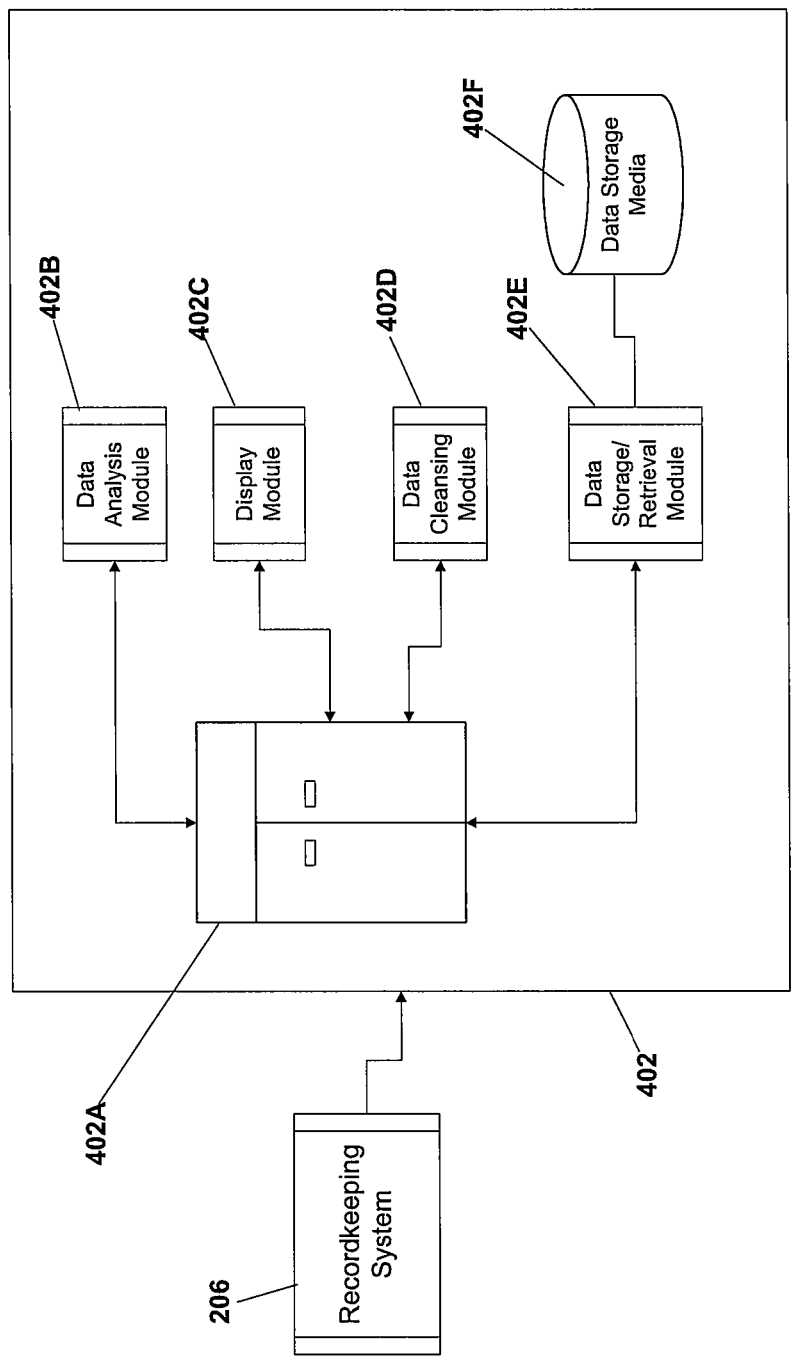
FIG. 4 includes a system architecture diagram illustrating an example of a trade data processing system configured in accordance with embodiments of the invention.

In accordance with various embodiments of the invention, FIG. 4 illustrates an example of a system architecture structured for processing and analyzing trade data in connection with securities transactions. A trade data processing system 402 may be configured with a computer system 402A or other processor for receiving and processing trade data sets communicated from the recordkeeping system 206. The trade data processing system 402A may be operatively associated with one or more modules 402B-402E which perform various computing functions with the system 402. For example, a data analysis module 402B may be configured to perform calculations or data filtering operations involving the trade data. Also, a display module 402C may be configured to display summary results or formatted reports derived from analysis of trade data by the analysis module 402B, for example. The system 402 may also include a data cleansing module 402D for preparing raw trade data received from the recordkeeping system 206 for use by the system 402 in performing various data calculations or other analyses involving the trade data. In certain embodiments, a data retrieval module 402E may be configured to work in cooperation with one or more data storage media 402F, such as to store or retrieve trade data for performing various calculations or data filtering operations, and/or to provide access to the output results of calculations involving trade data. Such data storage media 402F may include one or more Microsoft "Access" databases. Examples of data stored in the data storage media 402F are shown in FIGS. 3A1-3F2.

Figure 5:
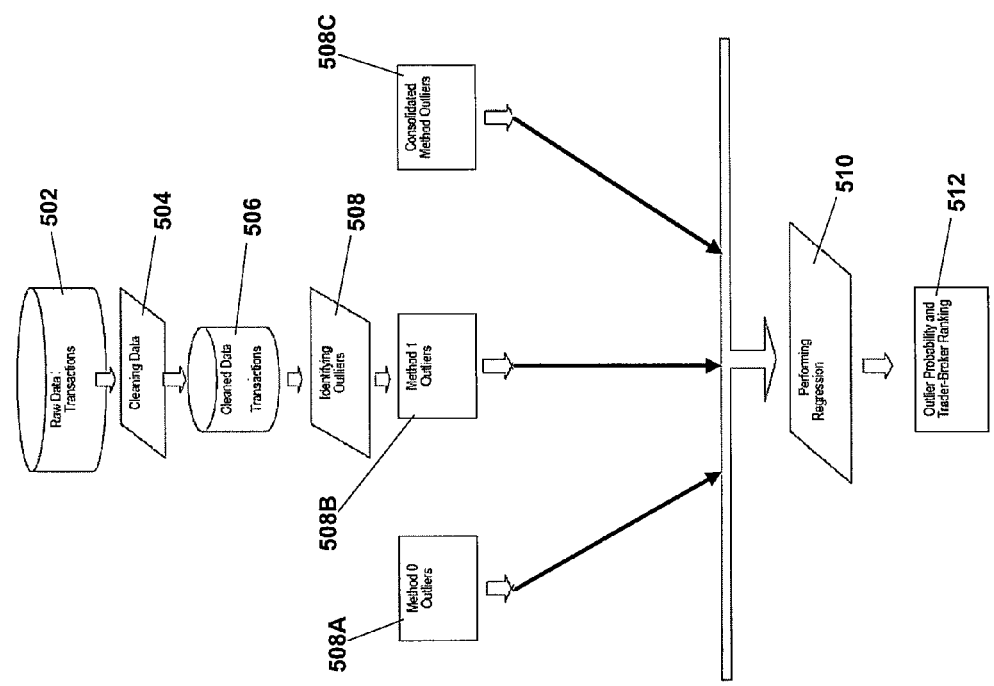
FIG. 5 includes a process flow diagram illustrating examples of processing trade data and executing trade data detection methodologies in accordance with embodiments of the invention.

FIG. 5 illustrates an example of a method for processing and analyzing trade data in connection with securities transactions and in association with the trade data processing system 402 embodiments described above. At step 504, a raw trade data set 502 can be communicated from the recordkeeping system 206 to the system 402. The raw trade data set 502 may be cleansed through use of the data cleansing module 402D, for example, prior to further processing by the system 402. The data cleansing operation at step 504 may include one more of the following activities or functions to eliminate or modify data in the raw data set 502: fixed income trades; transactions which represent a relatively small volume of activity; transactions involving third party activity (e.g., where a lending entity is not executing trades, but where its systems are being utilized for execution); transactions including input errors by traders, for example, that would have been corrected the following day (e.g., negative demand spreads); trades entered in association with corporate action activity; and/or, trades not executed during the relevant time period desired for the analysis. The output of data cleansing performed at step 504 may yield a cleansed trade data set 506.

At step 508, embodiments of the invention may include applying multiple trade detection methodologies to the cleansed data set 506. For example, at step 508A, a first trade detection methodology (herein sometimes referred to as "Method 0") may be applied to the cleansed data set 506 (or an otherwise initial trade data set). In certain embodiments, the first trade detection methodology of step 508A is applied to analyze groups (e.g., pairs) of security transactions of the same CUSIP (i.e., designation for Committee on Uniform Security Identification Procedures, or another security identifier) within a given day or on an intra-day basis. The first detection methodology then analyzes each grouping of transactions to determine the variance spread between the trades. If the variance spread exceeds a predetermined variation threshold range (e.g., 100 bps, 200 bps, etc.), then each trade in the grouping can be flagged or identified as an outlier trade. It can be appreciated that multiple variation threshold ranges may be applied in connection with executing the first trade detection methodology. For example, a 100 bps variation threshold range might be employed in conjunction with a 200 bps threshold range.

For example, if a given security were traded on the same day twice, a determination can made as to whether or not that trade had a greater than 200 bps variance spread, meaning that the respective values of the trades were more than 200 bps apart. If the trades are found to be outside the 200 bps variation threshold range, then the trade can be flagged under the first detection methodology with a "1" designation in the data set to identify the trade as an outlier trade. In another example, assume that more than two trades of the same security were involved on the same day (i.e., Trade A, B and C). Next, suppose that Trade A and Trade B were not 100 bps apart (i.e., the selected variation threshold range), but that Trade C was more than 200 bps apart from either Trade A or Trade B. In this example, the Trade A versus Trade B transaction would not initially be flagged as an outlier. However, Trade A versus Trade B versus Trade C would be flagged, ultimately resulting in potentially all three trades being flagged as outliers. Examples of data processing performed in connection with Method 0 are shown in FIGS. 6A and 6B.

It can be seen that the first detection methodology is based on the assumption that the value (e.g., demand spread) of a given security transaction (e.g., stock loan) on a given day should be basically the same no matter who is trading the security. Thus, for example, the value of a CUSIP on any given day should be the same or within the bounds of plus or minus 100 bps and plus or minus 200 bps (or other suitable demand spread or variation threshold ranges). In this example, if CUSIP XYZ generated an intrinsic spread of 200 bps at one point in the day and later generated a demand spread of 150 bps, the first trade would not be classified as an outlier nor would the second trade. In various embodiments, trades that have only one CUSIP specific trade on a given day can be classified as "null" or inconclusive (i.e., such trades cannot be grouped or paired with another trade). As desired, such null trade data may be treated as outlier data, non-outlier data, or otherwise excluded from the calculations and analyses.

The inventors understand that use of a single trade detection methodology may not be sufficient for detecting trade outliers. One problem with a single methodology is that it does not take auto-correlation of prices into consideration, meaning that over time a security may become weaker in value because of market conditions, and shorting activity might cause a change in the rebate rate that can be expected from a loan transaction involving the security. Thus, a trend can be created wherein at the beginning of a day the security might be at a 15-bps spread, and at the end of the day the security could be at a 300-bps spread, because market news developing during the course of the day has impacted the security.

Accordingly, at step 508B a second trade detection methodology (referred to sometimes herein as "Method 1") may be applied to analyze the average demand spread for given securities for a pre-period before a given trade date and for a post-period after a given trade date. For example, the second trade detection methodology may consider groups or pairs of trade data both three days before the trade and three days after the given trade. In addition, non-trading days such as holidays or weekends, for example, may be excluded from the analysis. The second methodology may use data points within the pre-period and the post-period surrounding the given trade date to create an extrapolated expected value. In certain embodiments, the extrapolated expected value may be the average of: (1) the weighted average rebate rate of trades associated with the security in the pre-period; and (2) the weighted average rebate rate of trades associated with the security in the post-period. Once the extrapolated expected value has been calculated, a variation threshold range can be applied around the extrapolated expected value (e.g., +/−200 bps). If a given trade falls outside the variation threshold range of the extrapolated expected value, then the trade can be identified as an outlier trade and can be flagged appropriately in the data set as an outlier.

It can be appreciated that multiple variation threshold ranges may be applied in connection with executing the second trade detection methodology. For example, a 100 bps variation threshold range might be employed in conjunction with a 200 bps threshold range. In situations in which comparison trades only exist in either the pre-period before or the post-period after a trade (i.e., a pairing of trades cannot be made), then a single weighted average can be used for analysis purposes. In similar fashion to Method 0 described above, trades that have no comparison data within the pre-period or the post-period can be categorized as null or inconclusive. As desired, such null trade data may be treated as outlier data, non-outlier data, or otherwise excluded from the calculations and analyses. Examples of data processing performed in connection with Method 1 are shown in FIGS. 7A and 7B.

Figure 8:
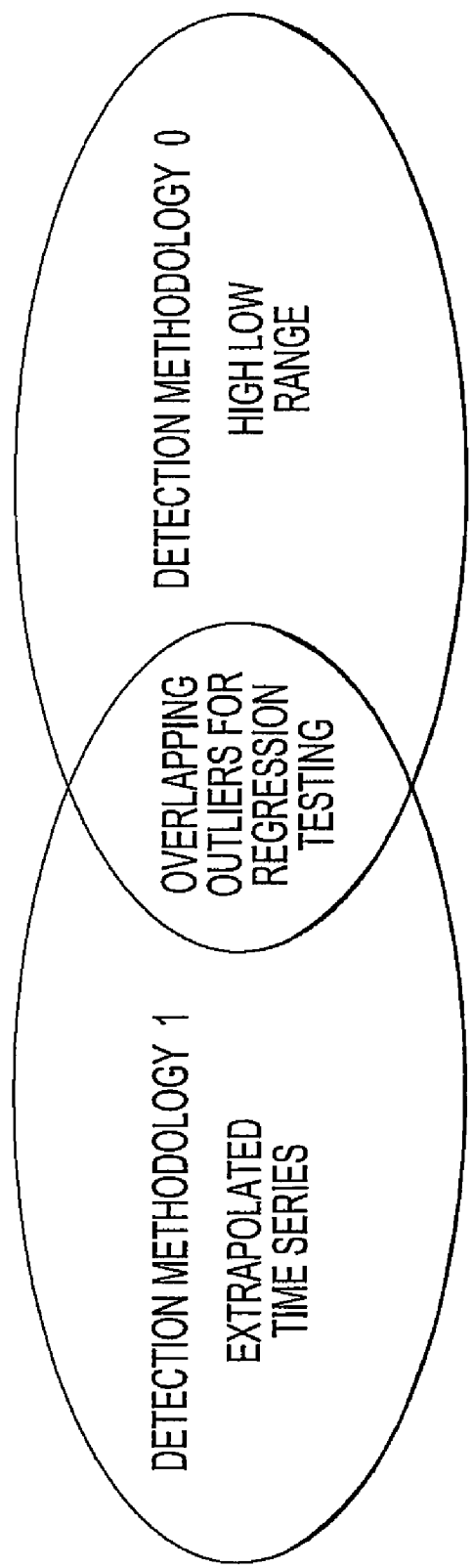
FIG. 8 schematically represents the results of a consolidated methodology executed in accordance with embodiments of the invention; and, FIGS. 9A and 9B include examples of data processed under a consolidated methodology executed in accordance with embodiments of the invention.

With reference to FIGS. 5 and 8, at step 508C, a consolidated methodology can be applied to the trade data set to identify outliers. As shown in the schematic illustration of FIG. 8, the consolidated methodology represents the union of data sets derived from the first trade detection methodology (step 508A) and the second trade detection methodology (step 508B). In various embodiments, the consolidated trade data set may include outliers that are determined to be outliers under both the first and second trade detection methodologies. For example, a trade may be designated as an outlier for a given day because the trade has high variability within that day, but the trade may not also exhibit similarly high variability over a given period of time (e.g., within the pre-period and the post-period). Accordingly, such a trade may not deemed to be an outlier included within the consolidated trade data set, because the trade does not pass outlier criteria determinations under both the first and second trade detection methodologies. Examples of consolidated outlier data are shown in FIGS. 9A and 9B.

In one example of execution of the consolidated methodology, the results for Method 0 and Method 1 can be consolidated by combining the results of both methodologies for a lower bound 200 bps category only. In addition, for each trade, the process may default in sequence to first pick "1" (outlier) over "0" (non-outlier) and then "Null" (null or inconclusive data); then "0" over "Null"; and finally "Null" across both methodologies. This can create a consolidated outlier data set that summarizes the results of both methodologies. The advantage of the approach in this example is reduction of the null set generated in Method 0 and Method 1, which at the same time provides a more conservative approach to detection, because it is a combination of outliers, not a pairing of outliers. For example, if a Method 0 trade data designation is "0" and a Method 1 trade data designation is "1", then the consolidated outlier data set data may be designated as "1" (i.e., as an outlier). It can be seen that reduction of null data is helpful to reduce the number of trades that are inconclusive and thereby reduces the use of inference techniques to assess the impact of nulls in the data set.

Once a final outlier trade data set has been established, at step 510 the outlier trade data set can be processed through a regression analysis, such as a logit model, to determine probabilities for given trades, trader/broker relationships, and other data patterns. Such regression analyses may be performed through use of the "EViews" software package, for example. In one example, a binary logit regression model may be used, which is represented below:

$$y^*_i = \beta' x_i + u_i$$

where $y^*_i$ is the dependent variable which is a binary variable with 1 representing if that particular transaction/trade was an outlier and 0 if it is not, $x_i$ represents the trader-broker relationships which is explained below, $\beta$ represents the estimated coefficients and $u_i$ is the error term. In practice, $y^*_i$ is unobservable and defined as follows: $y=1$, if $y_i^* > 0$; or $y=0$ otherwise. Combining the above equations provides Prob $(y_i=1) = \text{Prob}(u_i > -\beta' x_i) = 1 - F(-\beta' x_i)$, where F is the cumulative distribution function for u. The likelihood function is as follows:

$$L = \prod_{yi=0} F(-\beta'x_i) \prod_{yi=1} [1 - F(-\beta'x_i)]$$

If it is assumed that the error term has a logistic distribution, then the model becomes a logit model:

$$F(-\beta'x_i) = \frac{\exp(-\beta'x_i)}{1 + \exp(-\beta'x_i)} = \frac{1}{1 + \exp(\beta'x_i)}$$

and the following equation represents the probability that the transaction is an outlier, given the existence of the trader-broker relationship:

$$1 - F(-\beta'x_i) = \frac{\exp(\beta'x_i)}{1 + \exp(\beta x_i)}$$

For each transaction in the regression analysis, the trader and the broker used for the trade can be identified. For example, if Trader A used Broker 101 for a given transaction, then a value of "1" can be assigned to Trader A-Broker 101 relationship and all other trader-broker relationships are assigned a value of "0". By combining the outliers and the non-outliers in this fashion, the regression model is able to distinguish significant trader-broker relationships from non-significant ones. In addition, with respect to Method 0 and Method 1, regression models can be used, for example, to determine the significance of trades that fall below 100 bps and 200 bps lower bounds and above 100 bps and 200 bps upper bounds. In certain embodiments, the output of Method 1 with and without nulls below 200 bps and the output of the consolidated methodology below 200 bps with and without nulls can be processed through the regression analysis. The purpose of having both regressions with and without nulls is to test the impact of the null data on the regression coefficients. It can be seen that the effect of null data on the regression analyses can be approached statistically by evaluating the change in regression results with and without the null data. If the regression coefficient ordering exhibited in the two regressions (i.e., one regression without null data, and one regression with null data) are consistent, then it can be assumed that the impact of the null data on the larger population of data and analysis results is likely insignificant.

After estimation, the probability or significance of each transaction in explaining the outlier data can be calculated at step 512. These probabilities can then be ranked to see which transaction or trade is the most important for each model. This facilitates a ranking from highest to lowest probability for trader and broker relationships that generate outliers. Once the coefficients for the logit model have been determined, fitted probabilities can be generated to isolate trades that generate the highest probability of creating outliers. In addition to the significance of the trades, specific trades that have the highest probabilities or significance among the trades that are outliers can be identified. These trades can be identified by processing the identified outliers through the regression model and ranking the trades by their calculated probabilities. Thus, utilizing logistical regression on a binary data set of outliers to look for possible combinations between different independent variables in the data set allows for creation of a rank order probability table of trades deemed to be outliers. One end result of these data analyses is the identification of a core set of outlier trades that have a statistically significant correlation with specific borrowers and traders. These trades can then be further analyzed to determine the circumstances surrounding the trade around the time the trade was performed.

It can be seen that embodiments of the invention provide trader profiling as a risk management tool for managing hedge fund trading activity, securities lending activity, as well as other areas in which securities transactions are performed. The trader profiling methodologies described herein can be a trading-focused model for the development of new controls and process improvements in the securities lending operations of financial institutions. Embodiments of the invention can be employed to evaluate relatively large data sets of trade data and efficiently identify trading activity areas that would benefit from further investigation or improvement. Also, the processes, systems, and tools described herein are documentable, analytically driven, can be readily tested for validity and accuracy.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, user interface layouts, or screen displays described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In general, it will be apparent to one of ordinary skill in the art that various embodiments described herein, or components or parts thereof, may be implemented in many different embodiments of software, firmware, and/or hardware, applications, or modules thereof. The software code or specialized control hardware used to implement some of the present embodiments is not limiting of the present invention. It can also be appreciated that certain process aspects described herein may be performed using instructions stored on a computer-readable memory medium or media that direct a computer system to perform process steps. For example, the embodiments described hereinabove may be implemented in computer software using any suitable computer software language type such as, for example, C, C#, .NET, SQL, MySQL, HTML, or C++ using, for example, conventional or object-oriented techniques. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site).

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable memory medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "propagation medium" may include one or more data signals transmitted on one or more carrier waves. Such a medium may include any of the forms listed above with respect to storage devices and may further include, for example, a carrier wave modulated, or otherwise manipulated, to convey instructions that may be read, demodulated/decoded and executed by a computer.

A "computer," "computer system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

What is claimed is:

1. A computer-implemented method for processing a trade data set, the method comprising:
   using a processor to:
   apply a first trade detection methodology to the trade data set on an intra-day basis for identifying outliers in groups of trades in the trade data set, wherein identifying outliers with the first trade detection methodology includes analyzing each identified group of trades to determine whether a variance spread between the trades is outside at least one predetermined variation threshold range;
   apply a second trade detection methodology to the trade data set for identifying groups of trades in a pre-period and a post-period around a trade date for a security, wherein the second detection methodology includes:
   (i) calculating an extrapolated expected value in response to at least one value selected from the group consisting of a weighted average rebate rate for trades associated with the security in the pre-period and a weighted average rebate rate for trades associated with the security in the post-period, and
   (ii) analyzing the security trade in response to the extrapolated expected value and a variation threshold range around the extrapolated expected value to identify whether an outlier trade exists.

2. The method of claim 1, further comprising applying multiple variation threshold ranges in connection with executing the first trade detection methodology.

3. The method of claim 1, further comprising applying multiple variation threshold ranges in connection with executing the second trade detection methodology.

4. The method of claim 1, further comprising identifying null data in the trade data set and treating the null data as outlier data.

5. The method of claim 1, further comprising identifying null data in the trade data set and treating the null data as non-outlier data.

6. The method of claim 1, further comprising applying a consolidated methodology to combine results of the first and second trade detection methodologies to establish a consolidated outlier trade data set.

7. The method of claim 6, further comprising processing the consolidated outlier trade data set through a regression analysis.

8. The method of claim 7, further comprising determining the probability of creating an outlier on a trade-specific basis in connection with the regression analysis.

9. The method of claim 7, further comprising determining the probability of creating an outlier on a trader-broker relationship in connection with the regression analysis.

10. The method of claim 1, wherein the trade data set is derived from a trade transaction involving at least one broker and at least one trader.

11. The method of claim 1, wherein the trade data set is derived from a trade transaction involving at least one securities lending transaction.

12. The method of claim 1, further comprising performing at least one data cleansing operation on the trade data set.

13. The method of claim 12, wherein the data cleansing operation includes eliminating data selected from the group consisting of fixed income trade data, small volume activity data, transaction data involving third party activity, input errors, transaction data involving corporate action activity, and data derived from trades not executed during an analysis time period.

14. The method of claim 1, further comprising receiving raw trade data into the trade data set from a recordkeeping system.

15. A computer-implemented trade data processing system for processing a trade data set, the system comprising:
a module for applying a first trade detection methodology to the trade data set on an intra-day basis for identifying outliers in groups of trades in the trade data set, wherein identifying outliers with the first trade detection methodology includes analyzing each identified group of trades to determine whether a variance spread between the trades is outside at least one predetermined variation threshold range;
a module for applying a second trade detection methodology to the trade data set for identifying groups of trades in a pre-period and a post-period around a trade date for a security, wherein the second detection methodology includes:
(i) calculating an extrapolated expected value in response to at least one value selected from the group consisting of a weighted average rebate rate for trades associated with the security in the pre-period and a weighted average rebate rate for trades associated with the security in the post-period, and
(ii) analyzing the security trade in response to the extrapolated expected value and a variation threshold range around the extrapolated expected value to identify whether an outlier trade exists; and,
a processor for executing the functions of the modules.

16. The system of claim 15, further comprising a module for applying a consolidated methodology to combine results of the first and second trade detection methodologies to establish a consolidated outlier trade data set.

17. The system of claim 16, further comprising a module for processing the consolidated outlier trade data set through a regression analysis.

18. The system of claim 17, further comprising a module for determining the probability of creating an outlier on a trade-specific basis in connection with the regression analysis.

19. The system of claim 17, further comprising a module for determining the probability of creating an outlier on a trader-broker relationship in connection with the regression analysis.

* * * * *